United States Patent
Longuet et al.

(10) Patent No.: US 7,672,480 B2
(45) Date of Patent: Mar. 2, 2010

(54) METHOD FOR PHOTOGRAPHING ON BOARD OF A FLYING ROTATING BODY AND SYSTEM FOR CARRYING OUT SAID METHOD

(75) Inventors: Bernard Longuet, Chatenay-Malabry (FR); Bernard Teneze, Trouy (FR)

(73) Assignee: MBDA France, Paris (FR)

( * ) Notice: Subject to any disclaimer, the term of this patent is extended or adjusted under 35 U.S.C. 154(b) by 465 days.

(21) Appl. No.: 10/574,521

(22) PCT Filed: Oct. 5, 2004

(86) PCT No.: PCT/FR2004/002507

§ 371 (c)(1),
(2), (4) Date: Apr. 3, 2006

(87) PCT Pub. No.: WO2005/036458

PCT Pub. Date: Apr. 21, 2005

(65) Prior Publication Data

US 2007/0040853 A1 Feb. 22, 2007

(30) Foreign Application Priority Data

Oct. 6, 2003 (FR) .................................. 03 11659

(51) Int. Cl.
*G06K 9/00* (2006.01)
(52) U.S. Cl. ........................ 382/103; 382/293; 382/107; 342/6; 342/45; 345/7; 345/9; 345/156; 345/157; 715/740; 715/744; 244/3.16; 244/3.19; 244/3.15; 244/158.1

(58) Field of Classification Search ................. 345/657, 345/654; 244/3.16, 120, 3.1, 3.15, 3.17, 244/3.18, 3.21, 3.22, 158.1; 382/107, 293, 382/282, 295, 277, 278, 284, 191; 358/538, 358/453; 342/52, 53, 54, 61, 175, 195

See application file for complete search history.

(56) References Cited

U.S. PATENT DOCUMENTS

| 4,267,562 A | * | 5/1981 | Raimondi .................... 348/144 |
| 4,637,571 A | * | 1/1987 | Holder et al. ............... 244/3.16 |
| 4,639,571 A | * | 1/1987 | Lewandowski et al. 219/121.13 |
| 4,796,834 A | * | 1/1989 | Ahlstrom .................... 244/3.16 |
| 5,173,945 A | * | 12/1992 | Pieters et al. ................ 382/107 |
| 5,577,182 A | * | 11/1996 | Hayashi ...................... 345/657 |

(Continued)

FOREIGN PATENT DOCUMENTS

DE      EP0948197    *   3/1999

(Continued)

OTHER PUBLICATIONS

PCT International Search Report dated Mar. 4, 2005.

*Primary Examiner*—Vikkram Bali
*Assistant Examiner*—Nancy Bitar
(74) *Attorney, Agent, or Firm*—Dickinson Wright PLLC

(57) ABSTRACT

The invention relates to a method for photographing on board of a flying rotating body and system for carrying out said method. According to said invention, pictures ($V_0$, $V_{90}$, $V_{180}$, $V_{270}$) are taken at predetermined angular positions of said flying body by a device which is rigidly fixed to the front thereof and are exposed to an image geometrical transformation required for the display thereof.

8 Claims, 2 Drawing Sheets

U.S. PATENT DOCUMENTS 7,133,067 B1 * 11/2006 Claus et al. .............. 348/208.3
7,263,206 B1 * 8/2007 Milbert ...................... 382/103

FOREIGN PATENT DOCUMENTS

| EP | 0447080 | 9/1991 |
| EP | 0948197 | 10/1999 |
| GB | EP 447080 | * 10/1991 |

* cited by examiner

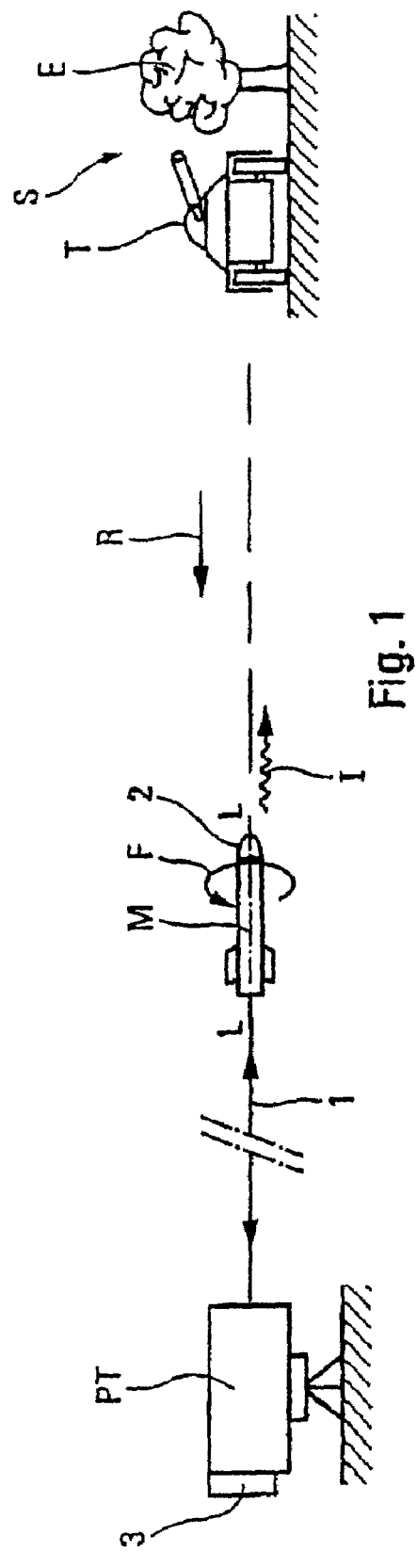
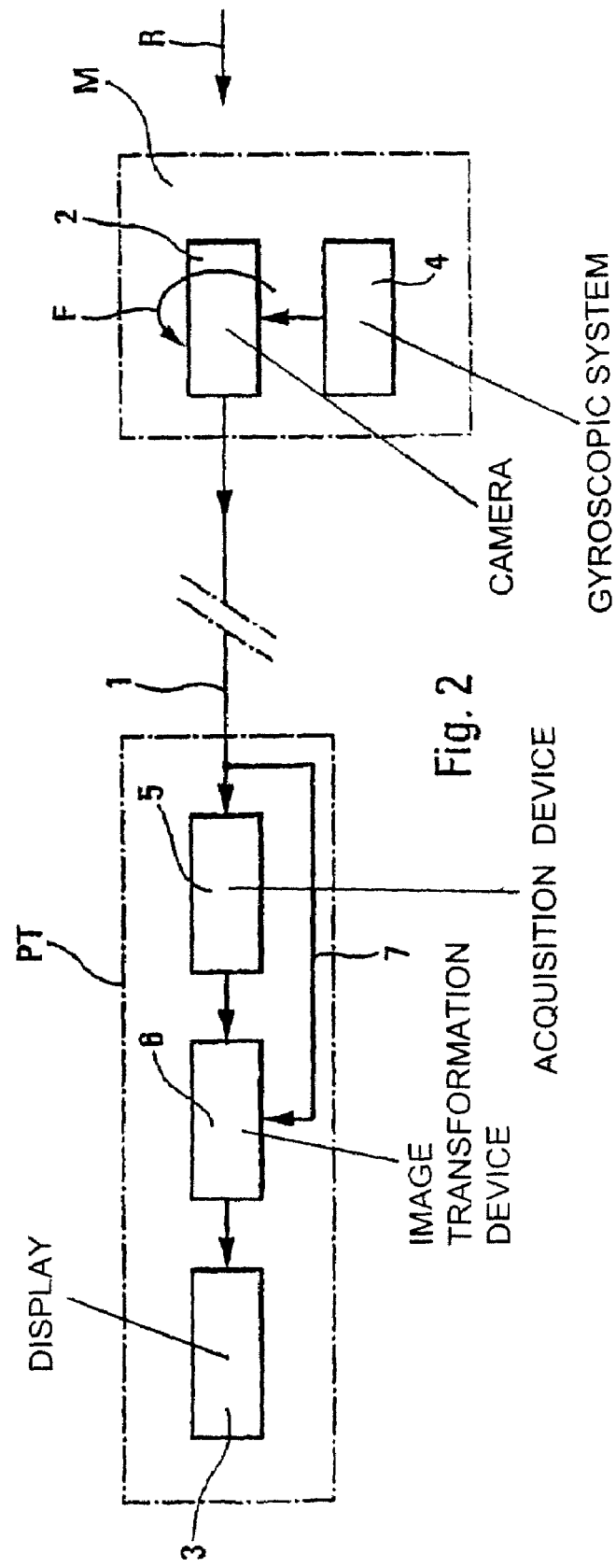

METHOD FOR PHOTOGRAPHING ON BOARD OF A FLYING ROTATING BODY AND SYSTEM FOR CARRYING OUT SAID METHOD

FIELD OF THE INVENTION

The present invention relates to a method for the formation, on a display stationed at a fixed post, of successive images of a scene towards which a flying body is moving while rotating about its longitudinal axis. It also relates to a system implementing this method.

Although not exclusively, the invention is particularly appropriate to the guidance of a rotating attack missile heading for a target and it will be more especially explained hereinbelow in conjunction with this application.

BACKGROUND OF THE RELATED ART

It is known that such rotating missiles are launched and guided towards their target (for example a tank) by means of a firing post, stationed at a fixed post, provided with a picture-taking apparatus and with a display. Thus, an operator can observe on said display the successive images of the scene in which said target lies, which images are addressed to said display by said picture-taking apparatus and which serve the operator in guiding said missile towards the target.

Such a system has the drawback that the missile itself appears on said images, so that the flames and/or the smoke emitted by its motor partially hide said scene, this possibly hampering the accuracy of the guidance of said missile.

To attempt to remedy such a drawback, it would be possible to imagine, by analogy with certain missiles stabilized in roll over their trajectory, mounting a camera aboard said rotating missile. However, it would then be indispensable to provide a roll-stabilized platform to receive said camera. However, the cost of a stabilized platform such as this is significant and it would not accord with common sense to use one on board a missile whose destruction is inevitable on first use.

SUMMARY OF THE INVENTION

The object of the present invention is to remedy these drawbacks.

To this end, according to the invention, the method for the formation, on a display stationed at a fixed post, of successive images of a scene towards which a flying body is moving while rotating about its longitudinal axis, said flying body communicating with said fixed post by virtue of linking means, is noteworthy in that a picture-taking apparatus is fixed rigidly to the front of said flying body, in such a way that said picture-taking apparatus turns with said flying body about said longitudinal axis;

during each revolution of the rotation of said flying body about said longitudinal axis, several pictures of said scene each corresponding to a predetermined angular position of said flying body about said longitudinal axis are taken with said apparatus, so that the contours of said pictures are inclined in mutually differing manners and that, in each picture, the image of said scene and said contour occupy a relative position which depends on said corresponding predetermined angular position of said flying body and which is different from that of the other pictures;

among said pictures, a reference picture is determined in which said relative position between the image of the scene and the contour is considered to be a relative reference position;

in each picture, other than the reference picture, a geometrical image transformation processing is applied to the image of said scene so that the relative position of the transformed image of said scene with respect to the contour is similar to said relative reference position; and said reference picture and said pictures having undergone said geometrical image transformation processing are displayed successively on said display.

Thus, the image of said flying body may not lie on said pictures and it is not necessary to provide a stabilized platform on said rotating flying body.

A system implementing the method of the invention and comprising:

at least one flying body, rotating about its longitudinal axis as it flies;

a fixed post furnished with a display able to display successive images of a scene towards which said flying body is moving while rotating; and linking means allowing the communications between said flying body and said fixed post, is noteworthy in that it furthermore comprises:

a picture-taking apparatus, fixed rigidly to the front of said flying body so as to observe said scene;

means for the control of said picture-taking apparatus at each of several predetermined angular positions of said flying body about said longitudinal axis; and means of geometrical image transformation processing making it possible to present the pictures taken by said apparatus at different angular positions with a similar relative position of the image of said scene with respect to the contour of said pictures.

Preferably, said means of control of the picture-taking apparatus consist of a gyroscopic system mounted on board said flying body and sensitive to the rotation of the latter contour of its longitudinal axis.

On the other hand, for obvious reasons of payload aboard the flying body, it is advantageous that said image processing means be stationed at the fixed post. In this case, the link between said picture-taking apparatus and said image processing means may be effected by said means of linking between said flying body and said fixed post.

Additionally, it is advantageous that the operation of said image processing means be controlled by said gyroscopic system by way of said means of linking between said flying body and said fixed post.

In case of insufficient lighting of said scene for taking of satisfactory pictures of said scene, the system in accordance with the present invention can comprise means of illumination, mounted on board said flying body and able to light said scene. The operation of said means of illumination can be synchronized with that of said picture-taking apparatus. Preferably, said means of illumination are integrated into the latter.

BRIEF DESCRIPTION OF THE DRAWINGS

The figures of the appended drawing will elucidate the manner in which the invention may be embodied. In these figures, identical references designate similar elements.

FIG. 1 illustrates, diagrammatically, a system applying the method in accordance with the present invention.

FIG. 2 is the schematic diagram of said system.

DETAILED DESCRIPTION OF THE INVENTION

Figure 3:
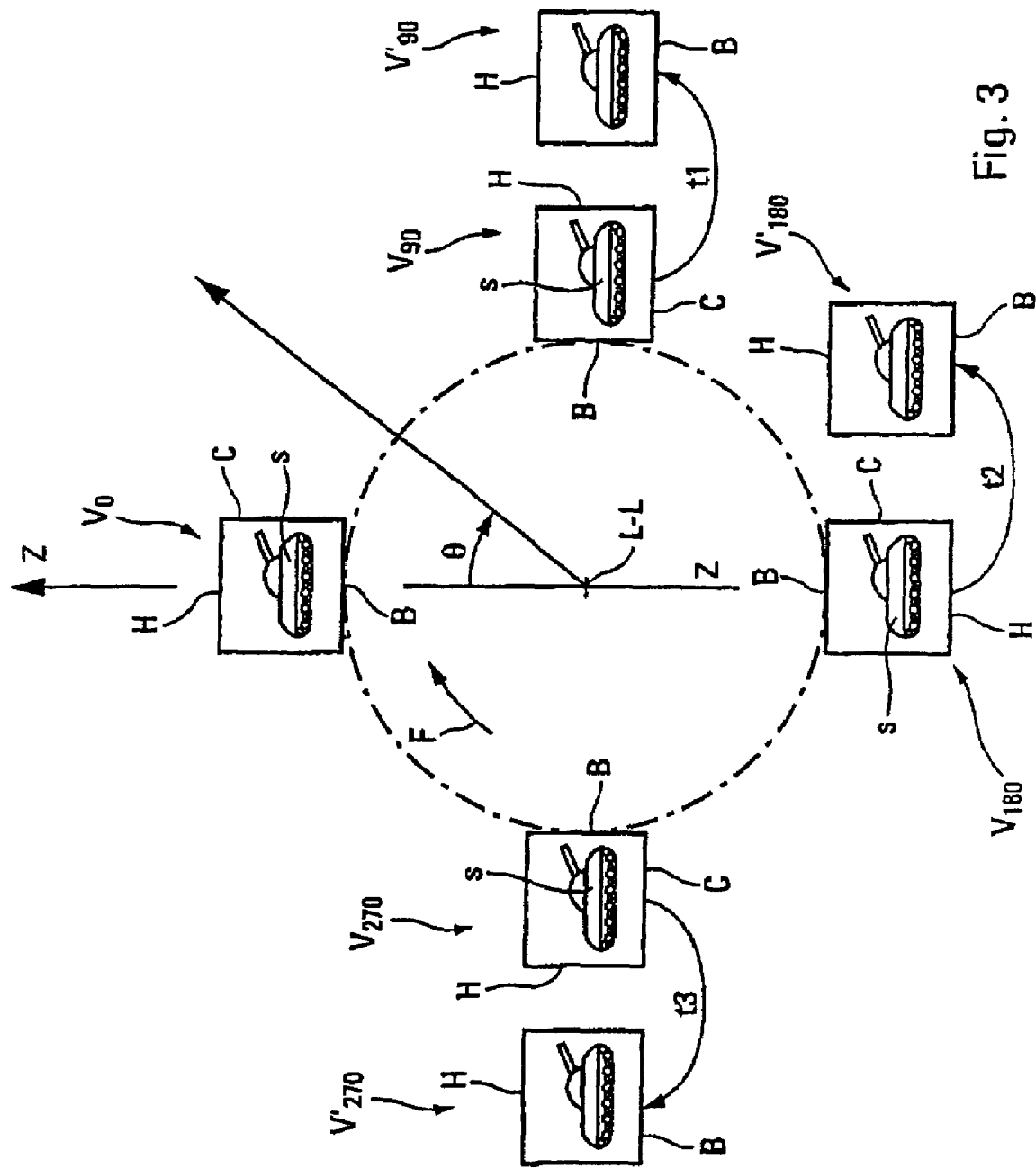
FIG. 3 illustrates, diagrammatically, the manner of operation of the system of FIGS. 1 and 2.

Represented diagrammatically in FIG. 1 is an attack missile M flying towards a target T forming part, together with other elements E (only one of which is represented) of a scene S. Moreover, the missile M rotates about its longitudinal axis. L-L as is illustrated by the circular arrow F of FIGS. 1 to 3.

The missile M is launched and guided from a firing post PT served by at least one operator (not represented). The missile M and the firing post PT are connected together by a link 1 allowing exchange of information. Such a link 1 may be embodied by RF waves or by a cable, electrical or optical, unfurling from said missile M.

The missile M carries, in its nose tip a camera 2, for example an electronic camera of CCD or CMOS type, observing the scene S from which it receives light rays R. Possibly, said missile M comprises an illuminator—possibly incorporated with the camera 2—lighting said scene S, to which it addresses light rays I.

Additionally, the firing post comprises a display 3, on which appear the images of the scene S, taken by the camera 2 and transmitted to said display 3 via the link 1.

In customary fashion, in the missile M is moreover provided a gyroscopic system 4, necessary for the deviometry measurements relating to said missile. By construction, the gyroscopic system 4 is able to deliver the instantaneous value $\theta$ of the angle of rotation of the missile M with respect to the vertical Z-Z (FIG. 3).

The camera 2 is controlled by the gyroscopic system 4 in such a way that, at each revolution of said missile about its longitudinal axis L-L, said camera takes an image $V_0$, $V_{90}$, $V_{180}$ and $V_{270}$ of the scene S when the angle $\theta$ takes each of the values 0°, 90°, 180° and 270° (see FIG. 3).

Thus, if the rate of rotation of the missile M lies between 5 and 10 revolutions per second, the camera 2 takes from 20 to 40 images per second.

To avoid the blurring of the images, the latter are acquired in a very short time, in a mode known as "snap shot", according to which a simultaneous acquisition is carried out of the images on all the pixels of the sensitive matrix of the camera 2, during a short integration time.

Additionally, the firing post PT comprises an image acquisition device 5, receiving the images—in electronic form—taken by the camera 2 and transmitted via the link 1. It furthermore comprises a geometrical image transformation device 6, interposed between the acquisition device 5 and the display 3. The geometrical image transformation device, generally designated by the title WARPER, may comprise, inter alia, the TMC 2301 component, manufactured by the American company TRW LSI and designated by the name Image Resampling Sequencer.

Just like the camera 2, the geometrical image transformation device 6 is sequenced by sequencing signals originating from the gyroscopic system 4 and conveyed by the link 1, as symbolized by the link 7.

Thus, as illustrated by FIG. 3, in the course of a revolution of the missile M about its longitudinal axis L-L, the camera 2 takes:

a reference picture $V_0$ on which appears the image s (represented solely by the silhouette of the target T in FIG. 3) of the scene S, corresponding to $\theta=0°$, whose contour C exhibits a lower edge B and an upper edge H;

a picture $V_{90}$, corresponding to $\theta=90°$, whose orientation has turned by 90° with respect to the reference picture $V_0$, so that now the left and right lateral edges of the contour C of said picture $V_{90}$ correspond respectively to the lower B and upper H edges of the contour C of the reference picture $V_0$;

a picture $V_{180}$, corresponding to $\theta=180°$, whose orientation has turned by 180° with respect to the reference picture $V_0$, so that now the upper and lower edges of the contour C of said picture $V_{180}$ correspond respectively to the lower B and upper H edges of the contour C of the reference picture $V_0$; and a picture $V_{270}$, corresponding to $\theta=270°$, whose orientation has turned by 270° with respect to the reference picture $V_0$, so that now the left and right lateral edges of the contour C of said picture $V_{270}$ correspond respectively to the upper H and lower B edges of the contour C of the reference picture $V_0$.

To ensure that, on the display 3, the relative position of the image s of the scene S and of the contour C is the same in said pictures $V_0$, $V_{90}$, $V_{180}$ and $V_{270}$, the geometrical image transformation device 6 transforms:

through a transformation t1, the picture $V_{90}$ into a picture $V'_{90}$ in which the image s of the scene S is turned by 90°, so that the lower and upper edges of the frame C of this picture $V'_{90}$ correspond respectively to the lower B and upper H edges of the reference picture $V_0$;

through a transformation t2, the picture $V_{180}$ into a picture $V'_{180}$ in which the image s of the scene S is turned by 180°, so that the lower and upper edges of the frame C of this picture $V'_{180}$ correspond respectively to the lower B and upper H edges of the reference picture $V_0$; and through a transformation t3, the picture $V_{270}$ into a picture $V'_{270}$ in which the image s of the scene S is turned by 270°, so that the lower and upper edges of the frame C of this picture $V'_{270}$ correspond respectively to the lower B and upper H edges of the reference picture $V_0$.

Thus, the pictures $V_0$, $V'_{90}$, $V'_{180}$ and $V'_{270}$ can appear successively on the display 3, giving the operator the impression of the continuity of the images of the scene S.

Possibly, in the unfavorable case of very weak lighting of the scene S, the illumination means incorporated into the picture-taking apparatus 2 are operated so as to light the scene S (light rays R) and to increase the lighting thereof in synchronism with the taking of pictures of said apparatus 2. These illumination means advantageously comprise a laser diode or a Vcsel laser as illumination component.

The invention claimed is:

1. A method for formation, on a display stationed at a fixed post, of successive images of a scene towards which a flying body is moving while rotating about its longitudinal axis, said flying body communicating with said fixed post by virtue of a communication link, a picture-taking apparatus being fixed rigidly to the front of said flying body, in such a way that said apparatus turns with said flying body about said longitudinal axis, said method:

taking with said apparatus, during each revolution of the rotation of said flying body about said longitudinal axis, several pictures of said scene each corresponding to a predetermined angular position of said flying body about said longitudinal axis, so that contours of said several pictures are inclined in mutually differing manners and so that, in each picture, the image of said scene and said contour occupy a relative position which depends on said corresponding predetermined angular position of said flying body and which is different from that of the other pictures;

determining, among said pictures, a reference picture in which said relative position between the image of the scene and the contour is considered to be a relative reference position;

applying in each picture, other than the reference picture, a geometrical image transformation processing to the image of said scene so that the relative position of the transformed image of said scene with respect to the contour is similar to said relative reference position; and displaying said reference picture and said pictures having undergone said geometrical image transformation processing successively on said display, wherein:

the rotation of the flying body is initiated at the moment of its launching.

2. A system comprising:

at least one flying body, rotating about its longitudinal axis as it flies;

a fixed post furnished with a display that displays images of a scene towards which said flying body is moving while rotating; and a link that provides for the communications between said flying body and said fixed post;

a picture-taking apparatus, fixed rigidly to the front of said flying body in such a way that said apparatus turns with said flying body about said longitudinal axis, said apparatus being configured to take, during each revolution of the rotation of said flying body about said longitudinal axis, several pictures of said scene each corresponding to a predetermined angular position of said flying body about said longitudinal axis, so that contours of said several pictures are inclined in mutually differing manners and so that, in each picture, the image of said scene and said contour occupy a relative position which depends on said corresponding predetermined angular position of said flying body and which is different from that of the other pictures and to determine, among said pictures, a reference picture in which said relative position between the image of the scene and the contour is considered to be a relative reference position;

a control unit that controls said picture-taking apparatus at each of several predetermined angular positions of said flying body about said longitudinal axis; and a processor that performs geometrical image transformation processing for presenting the pictures taken by said apparatus at different angular positions with a similar relative position of the image of said scene with respect to the contour of said pictures, wherein:

the rotation of the flying body is initiated at the moment of its launching.

3. The system as claimed in claim 2, wherein said control unit that controls the picture-taking apparatus comprises a gyroscopic system mounted on board said flying body and sensitive to the rotation of the latter about its longitudinal axis.

4. The system as claimed in claim 2, wherein said processor is stationed at the fixed post.

5. The system as claimed in claim 4, wherein a link between said picture-taking apparatus and said processor is effected by said link between said flying body and said fixed post.

6. The system as claimed in claim 3, wherein the sequencing of the operation of said processor is controlled by said gyroscopic system by way of said link between said flying body and said fixed post.

7. The system as claimed in claim 2, further comprising an illumination unit, mounted on board said flying body for lighting said scene.

8. A method for formation, on a display stationed at a fixed post, of successive images of a scene towards which a flying body is moving while rotating about its longitudinal axis, said flying body communicating with said fixed post by virtue of a communication link, a picture-taking apparatus being fixed rigidly to the front of said flying body, in such a way that said apparatus turns with said flying body about said longitudinal axis, said method comprising:

taking with said apparatus, during each revolution of the rotation of said flying body about said longitudinal axis, several pictures of said scene comprising:
  a reference picture in which the relative position between the image of the scene and the contour of said reference picture is considered to be a relative reference position and in which the instantaneous value of the angle of rotation of the flying body is considered to be equal to zero, and
  pictures in which the instantaneous values of said angle of rotation are respectively equal to 90°, 180°, and 270°;

illuminating said scene at least during the taking of said pictures;

applying in each picture, other than the reference picture, a geometrical image transformation processing to the image of said scene so that the relative position of the transformed image of said scene with respect to the corresponding contour is similar to said relative reference position; and displaying said reference picture and said pictures having undergone said geometrical image transformation processing successively on said display.

* * * * *